United States Patent
Gieseke et al.

(10) Patent No.: US 6,187,073 B1
(45) Date of Patent: Feb. 13, 2001

(54) AIR CLEANER; AEROSOL SEPARATOR; AND METHOD

(75) Inventors: Steven Scott Gieseke; Robert Allen Dushek, both of Richfield, MN (US)

(73) Assignee: Donaldson Company, Inc., Minneapolis, MN (US)

( * ) Notice: Under 35 U.S.C. 154(b), the term of this patent shall be extended for 0 days.

(21) Appl. No.: 09/271,622

(22) Filed: Mar. 17, 1999

(51) Int. Cl.[7] ................................................ B01D 46/00
(52) U.S. Cl. ............................ 55/485; 55/318; 55/323; 55/350.1; 55/385.3; 55/327; 55/502; 123/198 E
(58) Field of Search .................................. 55/385.3, 497, 55/502, 510, 315, 318, 323, 327, 350.1, 485, 486; 123/198 E

(56) References Cited

U.S. PATENT DOCUMENTS

| | | |
|---|---|---|
| Re. 21,965 | 12/1941 | Lowther . |
| Re. 35,433 | 1/1997 | Alexander, III . |
| D. 148,396 | 1/1948 | Stevens et al. . |
| D. 298,051 | 10/1988 | Matheson et al. . |
| 991,572 | 5/1911 | Weisenstein . |
| 1,838,751 | 12/1931 | Earnest . |
| 1,856,527 | 5/1932 | Winslow . |
| 2,060,883 | 11/1936 | Lowther . |
| 2,080,988 | 5/1937 | Schulz . |
| 2,120,050 | 6/1938 | Lowther . |
| 2,178,033 | 10/1939 | Decker . |
| 2,250,200 | 7/1941 | Lowther . |
| 2,252,974 | 8/1941 | Lowther . |
| 2,273,210 | 2/1942 | Lowther et al. . |
| 2,359,485 | 10/1944 | Lowther . |
| 2,539,378 | 1/1951 | Stootman . |
| 2,547,587 | 4/1951 | Lowther . |
| 2,642,052 | 6/1953 | Wagner et al. . |
| 3,115,873 | 12/1963 | Hahn et al. . |
| 3,167,416 | 1/1965 | Humbert, Jr. et al. . |
| 3,263,402 | 8/1966 | Lindamood et al. . |
| 3,266,229 | 8/1966 | Witkowski . |
| 3,450,117 | 6/1969 | McHattie et al. . |
| 3,509,967 | 5/1970 | Ballard . |
| 3,589,108 | 6/1971 | Dingel et al. . |
| 3,721,069 | 3/1973 | Walker . |
| 3,754,538 | 8/1973 | Ephraim, Jr. et al. . |
| 3,789,582 | 2/1974 | Graybill . |
| 3,796,025 | 3/1974 | Kasten . |
| 3,822,532 | 7/1974 | Weisgerber . |
| 4,018,580 | 4/1977 | Burkholz et al. . |
| 4,047,912 | 9/1977 | Markland . |
| 4,095,966 | 6/1978 | Isley . |
| 4,184,858 | 1/1980 | Walker . |
| 4,233,042 | 11/1980 | Tao . |

(List continued on next page.)

FOREIGN PATENT DOCUMENTS

| | | | |
|---|---|---|---|
| 0 576 783 A1 | 1/1994 | (EP) . | |
| 613386 | 6/1947 | (GB) . | |
| 661649 | 11/1951 | (GB) . | |
| 2035833 | * 6/1980 | (GB) | ...................................... 55/485 |
| 1711661 A3 | 2/1992 | (RU) . | |
| WO 99/00174 | 1/1999 | (WO) . | |

* cited by examiner

Primary Examiner—David A. Simmons
Assistant Examiner—Minh-Chau T. Pham
(74) Attorney, Agent, or Firm—Merchant & Gould P.C.

(57) ABSTRACT

A filter arrangement includes a tubular first filter element having a first media pack defining a first open filter interior and an air flow outlet. The air flow outlet is in gas flow communication with the first open filter interior. A housing construction has a gas flow inlet and a gas flow outlet. The air flow outlet of the first filter element is in gas flow communication with the gas flow outlet. A coalescer filter element is oriented in the housing construction in fluid communication with the gas flow inlet. A tubular second filter element is oriented in the housing construction and has a second media pack defining a second open filter interior. The second open filter interior is in gas flow communication with the gas flow outlet.

20 Claims, 11 Drawing Sheets

U.S. PATENT DOCUMENTS

| | | |
|---|---|---|
| 4,236,901 | 12/1980 | Kato et al. . |
| 4,269,607 | 5/1981 | Walker . |
| 4,378,983 | 4/1983 | Martin . |
| 4,401,093 | 8/1983 | Gates, Jr. et al. . |
| 4,404,950 | 9/1983 | Dallman . |
| 4,409,980 | 10/1983 | Goldberg . |
| 4,445,912 | 5/1984 | Volk et al. . |
| 4,559,138 * | 12/1985 | Harms, II ............................. 55/502 |
| 4,585,466 | 4/1986 | Syred et al. . |
| 4,602,595 | 7/1986 | Aoki et al. . |
| 4,627,406 | 12/1986 | Namiki et al. . |
| 4,632,682 | 12/1986 | Erdmannsdorfer . |
| 4,653,457 | 3/1987 | Stege . |
| 4,684,381 * | 8/1987 | Wasylyniuk ........................ 55/385.3 |
| 4,692,175 | 9/1987 | Frantz . |
| 4,704,143 | 11/1987 | Percy . |
| 4,724,807 | 2/1988 | Walker . |
| 4,759,782 | 7/1988 | Miller et al. . |
| 4,759,845 * | 7/1988 | Selenick ................................. 55/502 |
| 4,861,359 | 8/1989 | Tettman . |
| 4,878,929 | 11/1989 | Tofsland et al. . |
| 4,995,891 | 2/1991 | Jaynes . |
| 5,019,141 | 5/1991 | Granville et al. . |
| 5,035,729 | 7/1991 | Hodgkins . |
| 5,039,323 | 8/1991 | Ulitsky et al. . |
| 5,042,999 * | 8/1991 | Ernst et al. ............................ 55/502 |
| 5,046,474 | 9/1991 | Percy . |
| 5,137,557 * | 8/1992 | Behrendt et al. ..................... 55/502 |
| 5,140,957 | 8/1992 | Walker . |
| 5,277,157 * | 1/1994 | Teich ................................... 55/385.3 |
| 5,347,973 | 9/1994 | Walker, Jr. . |
| 5,391,212 * | 2/1995 | Ernst et al. ........................ 55/385.3 |
| 5,413,712 * | 5/1995 | Gewiss et al. ........................ 55/502 |
| 5,435,915 * | 7/1995 | Connors, Jr. .......................... 55/502 |
| 5,460,147 | 10/1995 | Bohl . |
| 5,471,966 | 12/1995 | Feuling . |
| 5,472,463 | 12/1995 | Herman et al. . |
| 5,479,907 | 1/1996 | Walker, Jr. . |
| 5,494,020 | 2/1996 | Meng . |
| 5,497,755 | 3/1996 | Maloney . |
| 5,540,617 * | 7/1996 | Siegel et al. ........................... 55/485 |
| 5,547,480 * | 8/1996 | Wulonuaux ............................ 55/502 |
| 5,556,440 * | 9/1996 | Mullins et al. ........................ 55/502 |
| 5,564,401 | 10/1996 | Dickson . |
| 5,586,996 | 12/1996 | Manookian, Jr. . |
| 5,633,341 | 5/1997 | Abend . |
| 5,653,870 * | 8/1997 | Tsuchiya et al. ...................... 55/502 |
| 5,660,607 | 8/1997 | Jokschas et al. . |
| 5,690,709 | 11/1997 | Barnes . |
| 5,713,985 | 2/1998 | Hamilton . |
| 5,752,999 | 5/1998 | Newby et al. . |
| 5,755,842 * | 5/1998 | Patel et al. ......................... 55/385.3 |
| 5,755,843 * | 5/1998 | Sundquist .......................... 55/385.3 |
| 5,759,217 | 6/1998 | Joy . |
| 5,795,369 | 8/1998 | Taub . |
| 5,853,439 | 12/1998 | Gieseke et al. . |
| 5,902,361 | 5/1999 | Pomplun et al. . |
| 5,972,063 * | 10/1999 | Dudrey et al. ........................ 55/485 |

AIR CLEANER; AEROSOL SEPARATOR; AND METHOD

FIELD OF THE INVENTION

The present invention relates to systems and methods for cleaning air and separating hydrophobic fluids (such as oils), that are entrained as aerosols, from gas streams (for example, air streams). Preferred arrangements also provide for filtration of other fine contaminants, for example carbon material, from the gas streams. Methods for conducting the separations are also provided.

BACKGROUND OF THE INVENTION

Certain gas streams, such as blow-by gases from diesel engines, carry substantial amounts of entrained oils therein, as aerosol. The majority of the oil droplets within the aerosol are generally within the size of 0.1–10.0 microns.

In addition, such gas streams also carry substantial amounts of fine contaminant, such as carbon contaminants. Such contaminants generally have an average particle size of about 0.1–1 microns.

In some systems, it is desirable to vent such gases to the atmosphere. In general, it is preferred that before the gases are vented to the atmosphere, the gases be cleaned of a substantial portion of the aerosol and/or organic particulate contaminants therein.

In other instances, it is desirable to direct the air or gas stream into equipment. When such is the case, it may be desirable to separate aerosol and/or particulates from the stream during the circulation in order to provide such benefits as: reduced negative effects on the downstream equipment; improved efficiency; recapture of otherwise lost oils; and/or to address environmental concerns.

A variety of efforts have been directed to the above types of concerns. The variables toward which improvements are desired generally concern the following: (a) size/efficiency concerns; that is, a desire for good efficiency of separation while at the same time avoidance of a requirement for a large separator system; (b) cost/efficiency; that is, a desire for good or high efficiency without the requirement of substantially expensive systems; (c) versatility; that is, development of systems that can be adapted for a wide variety of applications and uses without significant re-engineering; and, (d) cleanability/regeneratability; that is, development of systems that can be readily cleaned (or regenerated) if such becomes desired after prolonged use.

SUMMARY OF THE DISCLOSURE

A filter arrangement includes an air cleaner and an aerosol separator construction. The aerosol separator construction includes a coalescer filter, a housing construction, a second stage filter element, and a liquid collection arrangement. Preferably, a gaseous stream (for example, crankcase blow-by gas flow) is directed through the coalescer filter. The coalescer filter will act as a prefilter to remove carbon materials from the blow-by gas, and separate the gaseous stream into a liquid phase and a gas phase. Preferably, the gas phase is directed downstream through the second stage element and then into an airflow tube. In preferred constructions, the air cleaner is oriented for filtering air being taken in (for example, into a turbo) through the airflow tube.

In preferred embodiments, the filter arrangement, when operably assembled, will include a seal between the air cleaner and the second stage element; and a seal between the second stage element and the housing construction.

In one embodiment, the air cleaner includes a centering construction having a neck circumscribed by the airflow tube; and a lip circumscribing an outer periphery of the housing construction.

Preferably, the coalescer filter, the second stage element, and the air cleaner are removable and replaceable from the overall assembly.

Methods of filtering and servicing are described and will include constructions as described above.

DETAILED DESCRIPTION

A. A Typical Application—Engine System

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) oil or fuel aerosol principally comprising 0.1–5.0 micron droplets; and, (b) carbon contaminant from combustion, typically comprising carbon particles, a majority of which are about 0.1–10 microns in size. Such "blow-by gases" are generally directed outwardly from the engine block through a blow-by vent.

Herein, when the term "hydrophobic" fluids is used in reference to the entrained liquid aerosol in gas flow, reference is meant to nonaqueous fluids, especially oils. Generally, such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 0–50 cfm (typically 5 to 10 cfm) are fairly common.

Figure 1:
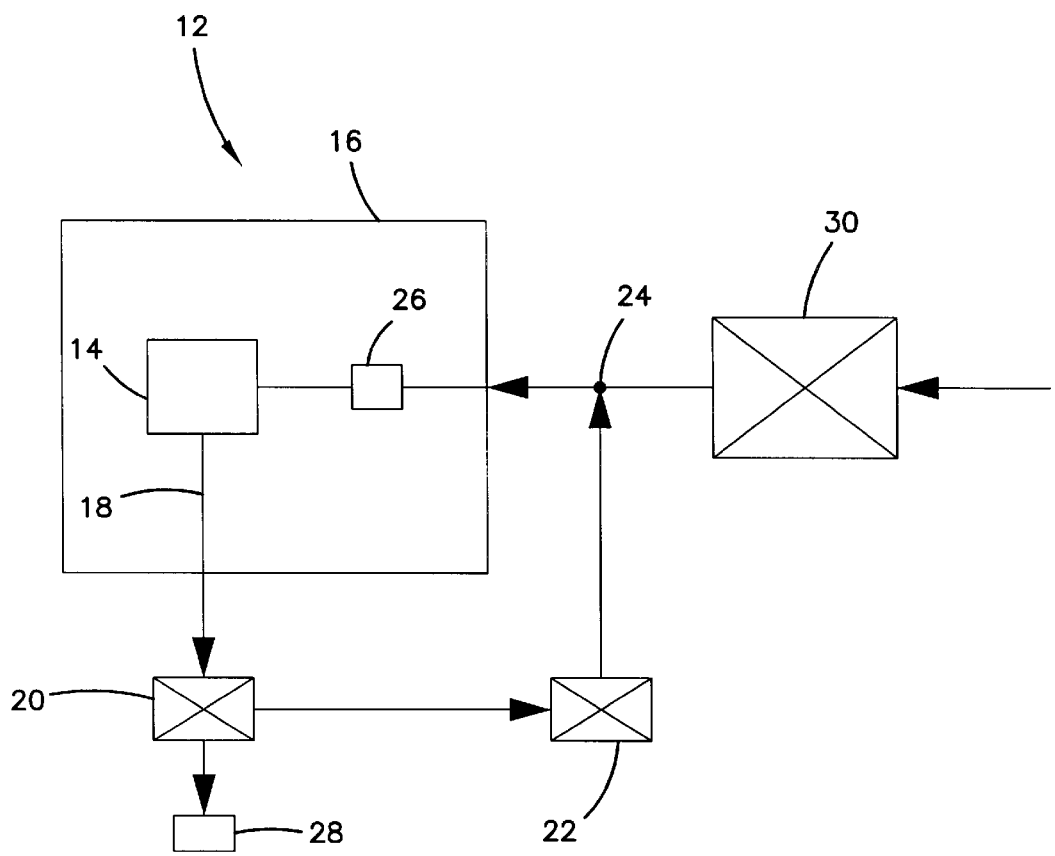
FIG. 1 is a schematic view of an engine system using an air cleaner and an aerosol separator arrangement.

FIG. 1 illustrates a schematic indicating a typical system 12 in which a filter arrangement according to the present invention would be utilized. Referring to FIG. 1, an engine is shown generally at 14. The engine 14 may generally comprise a diesel engine, although other types of engines are contemplated. The engine is mounted on a powered construction 16, such as a boat, a truck, or farm machinery. The engine 14 gives off a blow-by gas, that may carry substantial amounts of entrained oils therein as aerosol, and also substantial amounts of fine contaminant, such as carbon contaminants. The blow-by gasses are vented through a blow by vent 18. Downstream of the blow-by vent 18 is a coalescing filter 20. The coalescing filter 20 separates the blow-by gas into two components including a liquid component and a partially filtered gas component. A second stage filter 22 is attached to the coalescing filter 20. The second stage filter 22 acts to further purify the somewhat filtered gas component from the coalescer filter 20. That is, the second stage filter 22 removes fine particles that may still be remaining in the gas component. The purified gas is then directed into an engine intake system 24, such as a turbo 26. The liquid component from the coalescer filter 20 is directed into an engine sump 28.

The system 12 also includes an air cleaner 30. Air is taken into the engine 14 for combustion purposes. Before being taken into the engine 14, the air is cleaned by the air cleaner 30. The air is directed from the air cleaner 30 into the intake system 24, where it mixes with the air downstream of the second stage filter 22. This air mixture is directed into the turbo 26 and eventually into the engine 14 for combustion.

An arrangement for separating a hydrophobic liquid phase from a gaseous stream (sometimes referred to herein as a coalescer/separator arrangement) is provided. In operation, a contaminated gas flow is directed into the coalescer/separator arrangement. Within the arrangement, the fine oil phase or aerosol phase (i.e., hydrophobic phase) coalesces. The arrangement is constructed so that as the hydrophobic phase coalesces into droplets, it will drain as a liquid such that it can readily be collected and removed from the system. With preferred arrangements as described herein below, the coalescer or coalescer/separator, especially with the oil phase in part loaded thereon, operates as a prefilter for carbon contaminant carried in the gas stream. In preferred arrangements, the coalescer/separator arrangement is constructed with a removable media component for ease of cleaning or regeneration. In some preferred systems, at least a single downstream (or second) filter or polish filter is provided.

B. An Overview of a Multi-Stage Filter Assembly and Operation

Figure 2:
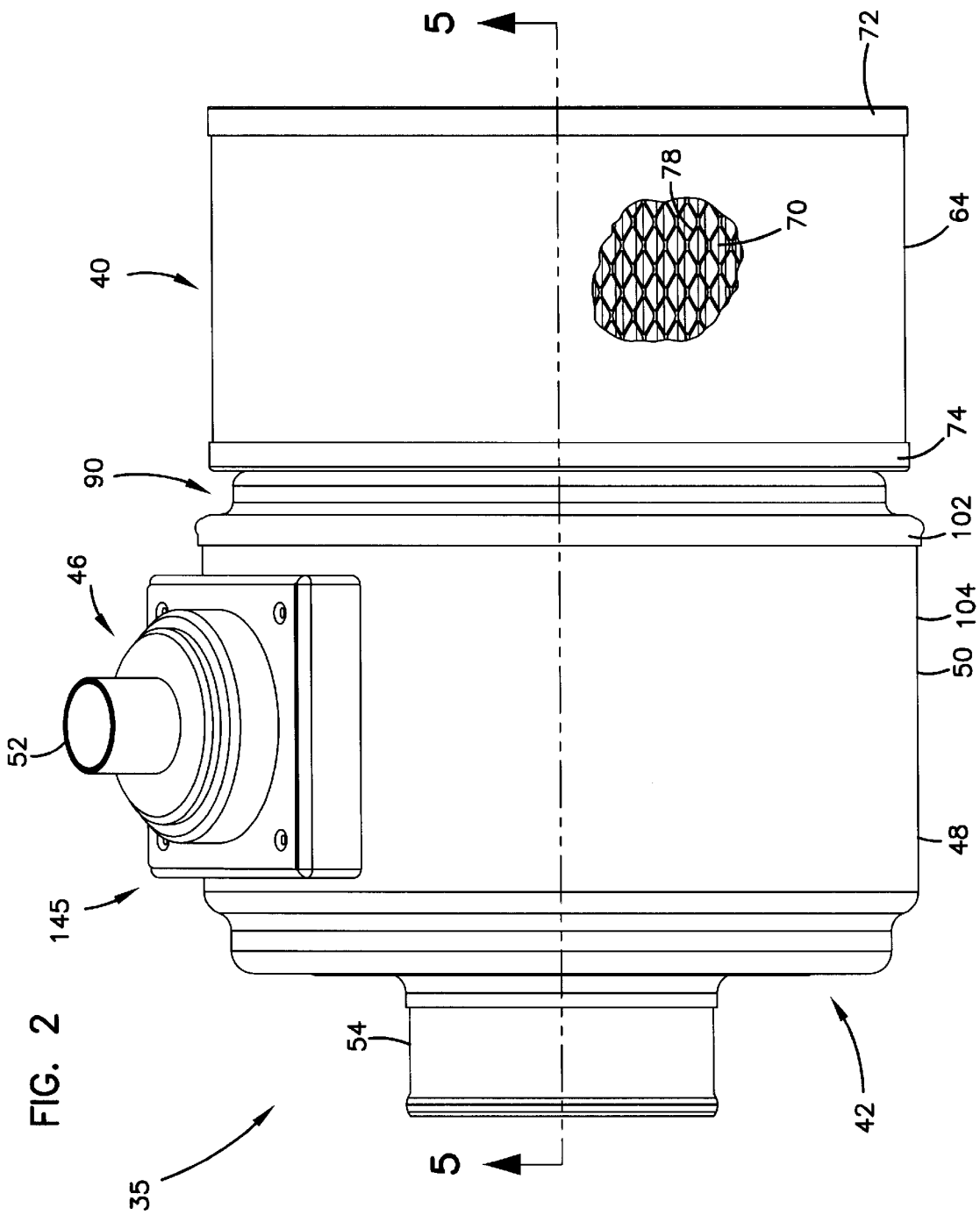
FIG. 2 is a schematic, front elevational view of a first embodiment of a filter assembly including an air cleaner and aerosol separator arrangement, constructed according to principles of this disclosure.

Attention is now directed to FIG. 2, in which a multi-stage filter assembly 35 is provided. The system is generally referenced to herein as "multi-stage" because it not only includes an air cleaner for filter air intake; but it also includes an aerosol separator/filter arrangement for blow-by and at least a single second stage filter, and could include multiple, downstream or second stage filters, for further purification of the air stream. The air cleaner and oil separator or coalescer/separator, as generally described herein, may, alternatively, be utilized in overall assemblies that do not include downstream filters.

In FIG. 2, a front elevational view of the filter assembly 35 is provided. In FIG. 2, the filter assembly 35 depicted includes an air cleaner 40 and a aerosol separator arrangement 42. In general, one stage of separation will occur with the air cleaner 40, while two stages of separation will occur in the aerosol separator arrangement 42.

The aerosol separator arrangement 42 will operate to coalesce or separate liquids from a liquid entrained gas generally at region 46. A second stage of separation in the aerosol separator arrangement 42 will occur downstream of the coalescer region 46 within the portion of the arrangement 42 indicated generally at 48.

Figure 3:
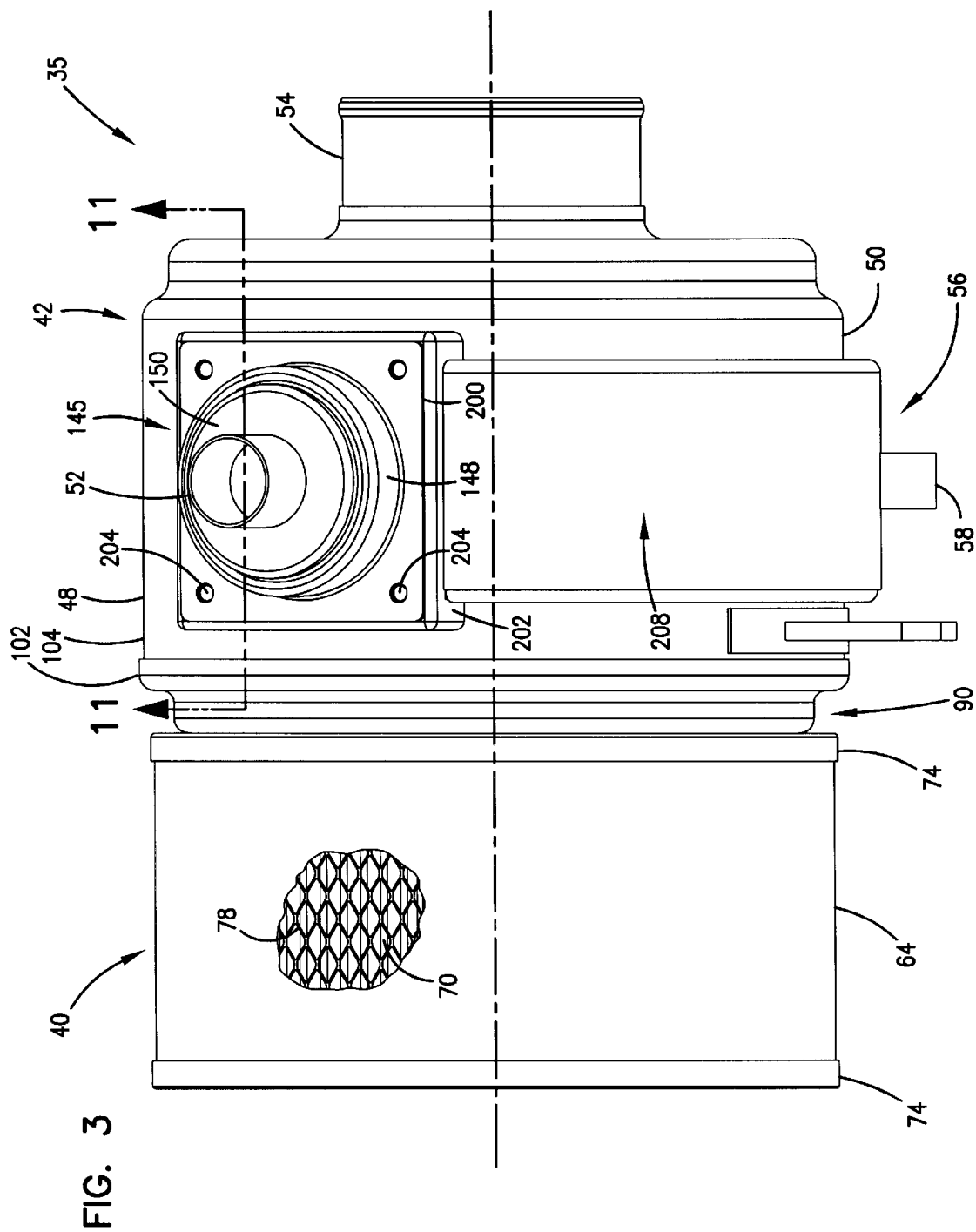
FIG. 3 is a schematic, rear elevational view of the filter assembly depicted in FIG. 2.

Still referring to FIG. 2, the separator arrangement 42 includes a housing 50 having an inlet tube construction 52 and an outlet tube construction 54. In use, liquid entrained gas is directed into the inlet tube construction 52 and through the coalescer region 46. Liquid coalesces within the region 46, drains down a drain construction 56 (FIGS. 3 & 4), and flows out through a drain or liquid flow outlet 58 (FIG. 3). The gas phase is directed through the second stage portion 22 (and a filter element positioned therein) and is directed outwardly from the separator arrangement 42 through the outlet tube construction 54.

When constructed according to principles described herein, the air 5 cleaner 40 will operate to remove particulates from a gas stream, typically air, being taken into an engine. In general, and still referring to FIG. 2, air will be taken through the air cleaner 40, where particulates will be removed. The cleaned air from the air cleaner 40 will join the cleaned air from the separator arrangement 42 to exit from the outlet tube construction 54. The air leaving the outlet tube construction 54 will typically be drawn into a turbo, such as turbo 26 (FIG. 1).

A detailed description of the components of the filter assembly 35 follows.

C. The Air Cleaner 40

Figure 6:
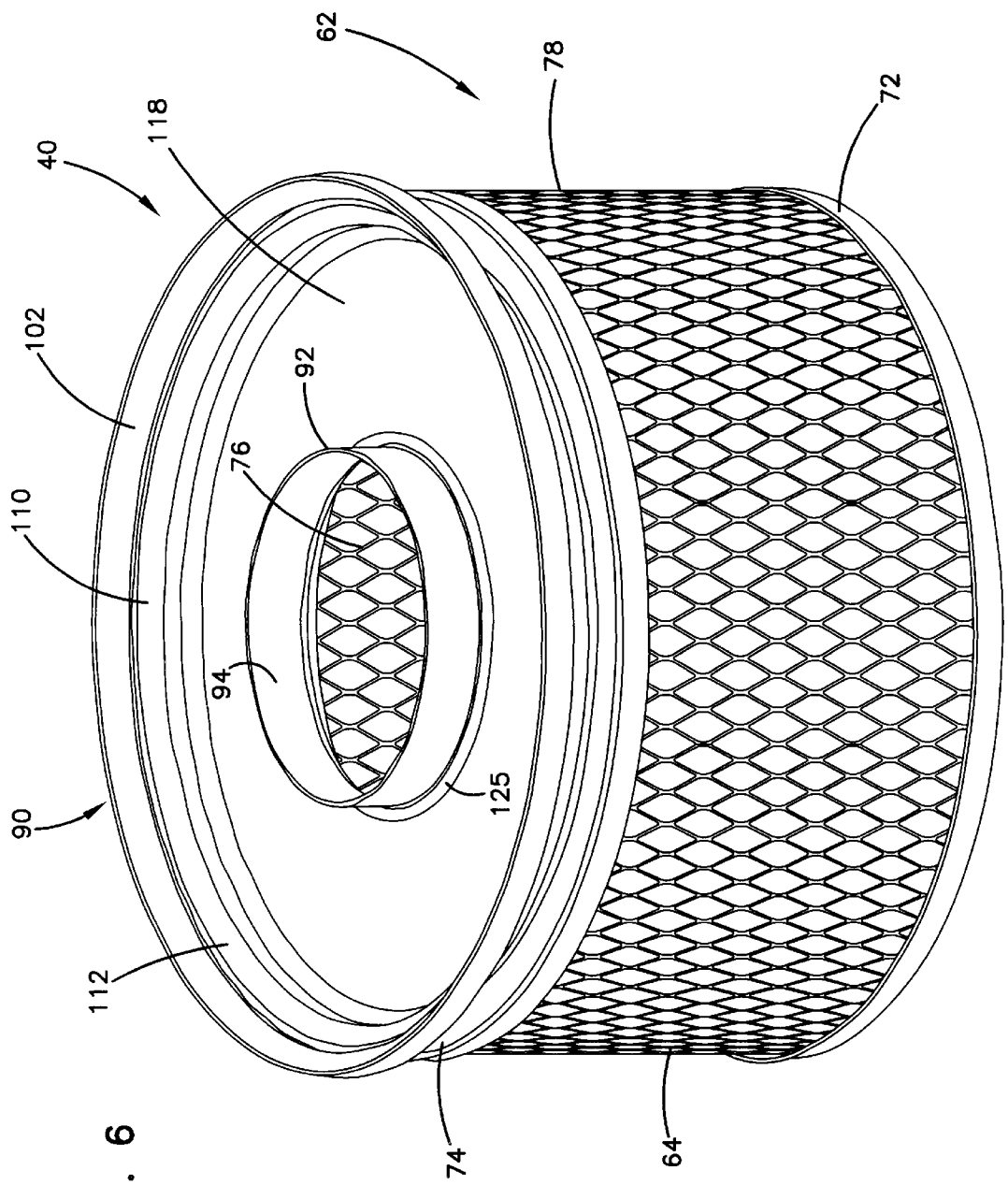
FIG. 6 is a schematic, top, perspective view of an embodiment of the air cleaner used in the filter assembly depicted in FIGS. 2–5.
Figure 7:
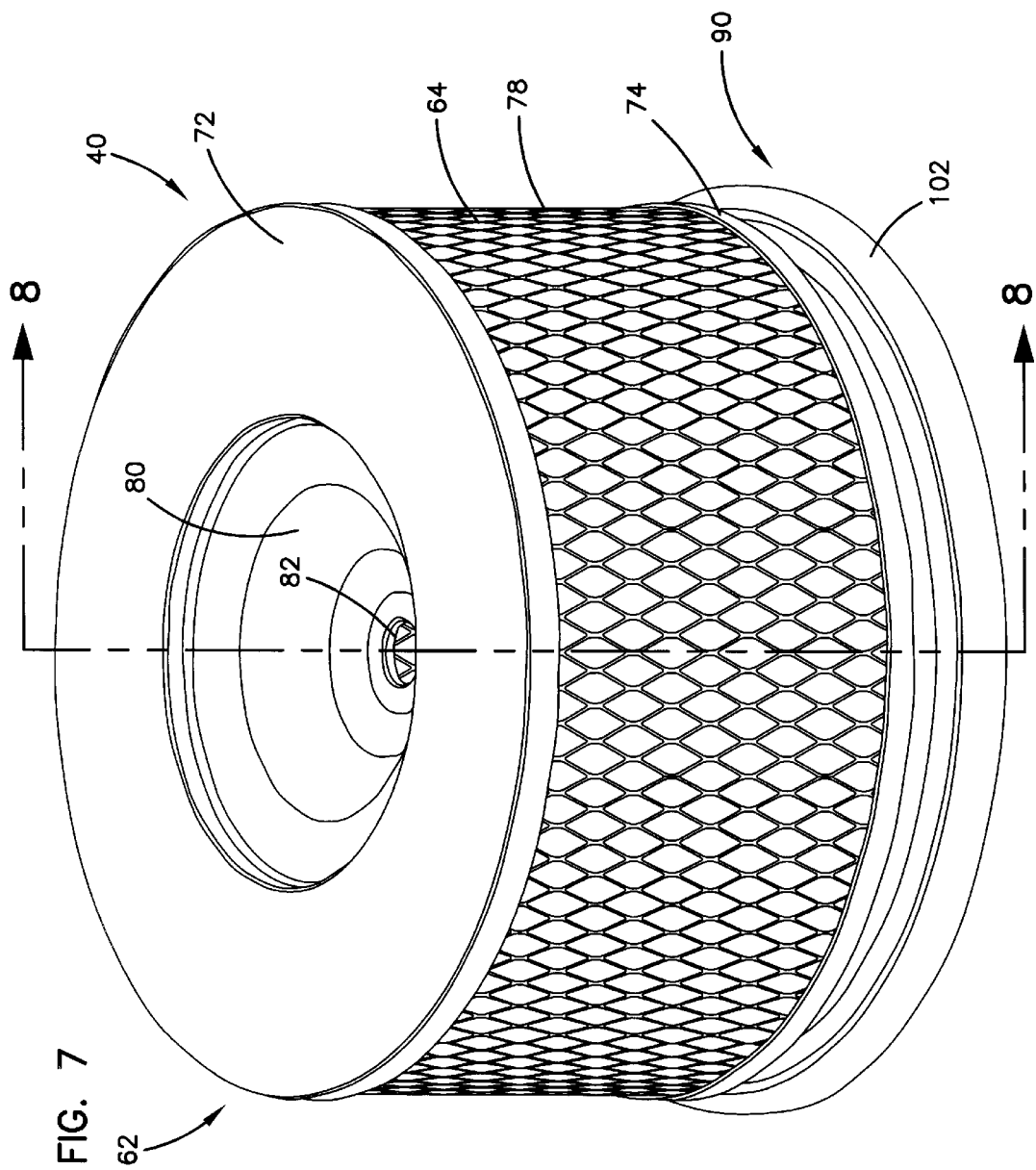
FIG. 7 is a schematic, bottom, perspective view of the air cleaner depicted in FIG. 6.
Figure 8:
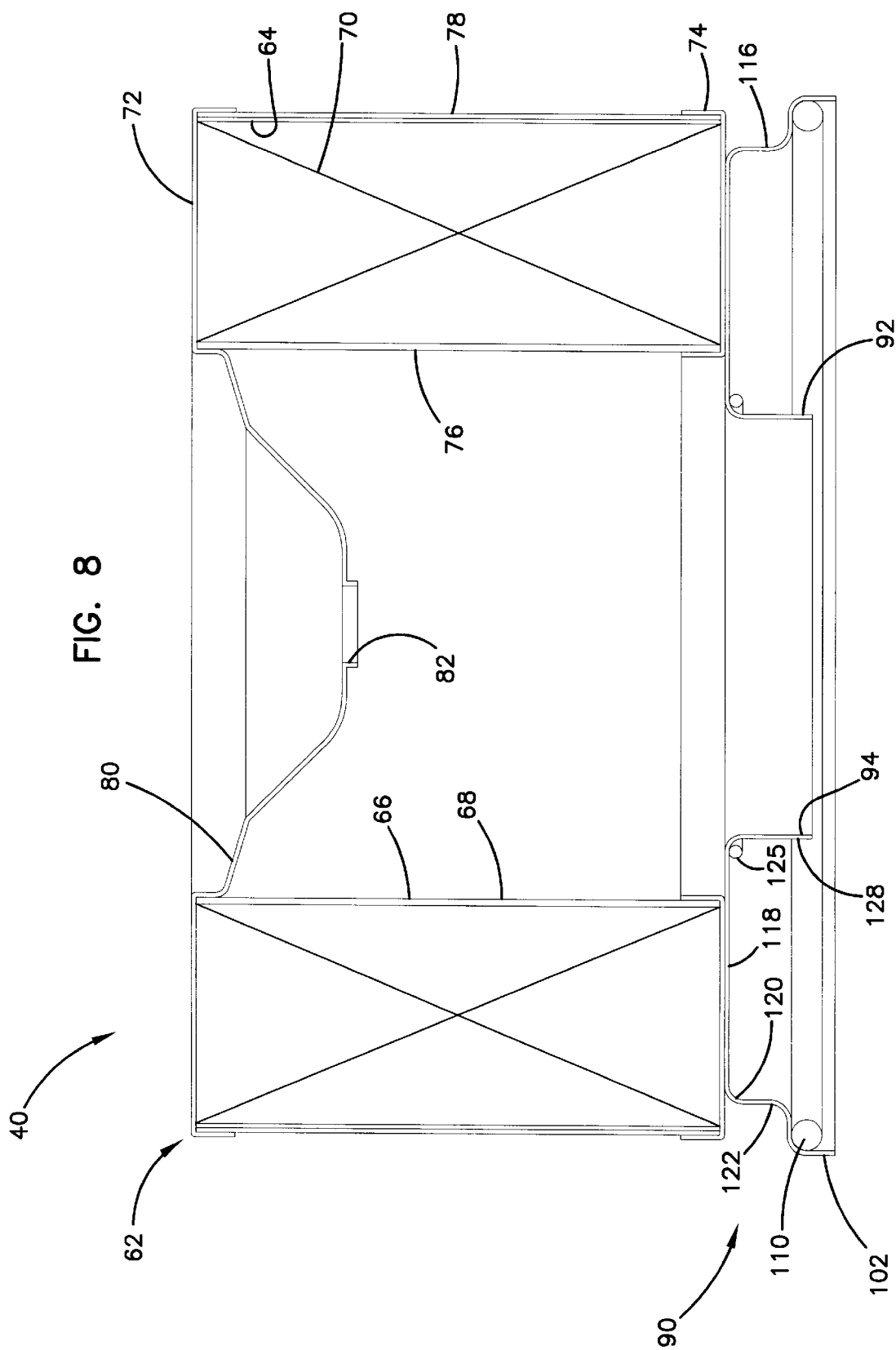
FIG. 8 is a schematic, cross-sectional view of the air cleaner depicted in FIG. 7 and taken along the line 8—8 of FIG. 7.

Attention is directed to FIGS. 6–8. The air cleaner 40 is illustrated in perspective views (FIGS. 6 & 7) and cross section (FIG. 8).

The air cleaner 40 is constructed and arranged to remove particulates from a gas or air flow stream passing therethrough. While a variety of constructions are contemplated, in the particular embodiments shown in FIGS. 6–8, the air cleaner 40 comprises a filter element 62 having a media pack 64.

The filter element 62 can be a construction with a first and second opposite flow face and be constructed and arranged for air to flow into the media pack through the first flow face, and for air to exit the media pack through the second flow face. Such constructions can include either panel filters or fluted filters. In fluted filter constructions, the flutes can have alternating upstream and downstream ends secured closed, such as constructions described in U.S. Pat. No. 5,820,646.

In the particular embodiment illustrated, the filter element 62 is arranged in a tubular construction, such that dirty air flows through the media pack 64 from the outside to an open filter interior 66 (FIG. 8), defining a clean air chamber 68.

The media pack 64 can include a variety of types of media. In the particular embodiment illustrated, the media pack 64 comprises pleated media 70, such as pleated paper. Usable media material is described in further detail below.

Supporting the pleated media 70 is an inner liner 76 and an outer liner 78. When constructed as shown in FIG. 8, the inner and outer liners will be cylindrical constructions, typically constructed from metal, such as expanded metal or perforated metal.

When constructed as shown in FIG. 8, the filter element 62 will include first and second end cap constructions 72, 74.

The pleated media 70 extends between the first and second end caps 72, 74 and typically is potted therewithin with urethane potting material.

The first end cap construction 72 includes a recessed or concave locking or bearing surface 80. The locking surface 80 defines a fastener hole 82 in a central portion of the locking surface 80. The locking surface 80 is part of an axial sealing system 84 (FIG. 5) that will be described further below.

In preferred constructions, the filter element 62 will include a centering construction 90. The centering construction 90 assists the user of the filter assembly 35 in servicing the assembly 35. In particular, the centering construction 90 assists the user in assembling the filter element 62 properly on the aerosol separator arrangement 42. The particular centering construction 90 shown is preferred, in that it leads to an overall filter assembly 35 that consists of no more than two pieces—the air cleaner 40 and the aerosol separator arrangement 42. By "two-pieces," it is meant that other than a fastener used in the axial sealing system 84, when the assembly 35 is disassembled, there will be no more than two, separate and distinct constructions.

Figure 5:
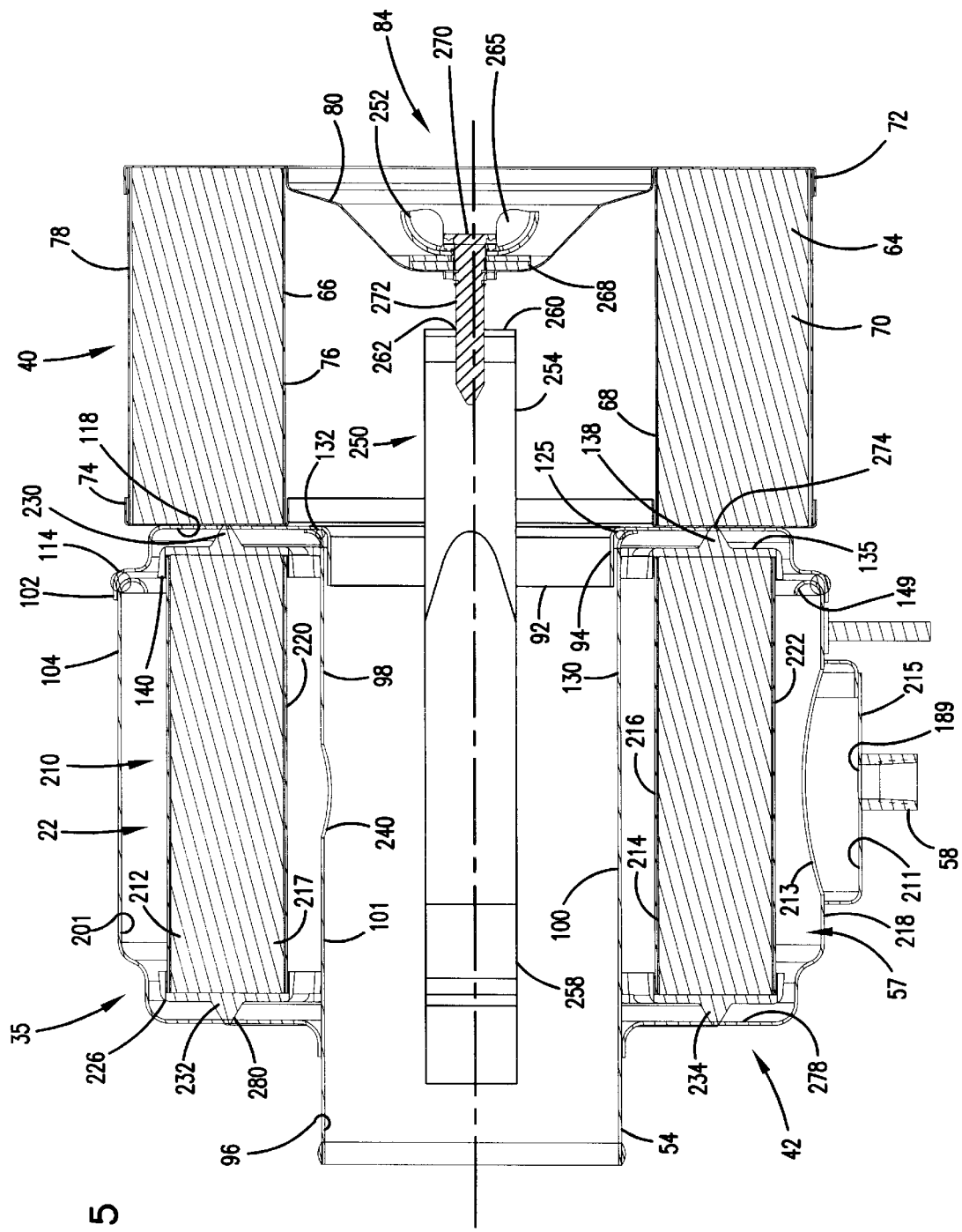
FIG. 5 is a schematic, cross-sectional view of the filter assembly depicted in FIG. 2 and taken along the line 5—5 of FIG. 2.

While a variety of centering constructions 90 are contemplated, in the particular embodiment illustrated in FIGS. 6–8, the centering construction 90 comprises a neck construction 92. The neck construction 92 defines an outlet path 94 for conveying gas flow from the clean air chamber 68 into an interior 96 of the outlet tube construction 54 (FIG. 5). In general, the neck construction 92 will be tubular. In the particular embodiment illustrated in FIGS. 6 and 8, the neck construction 92 is cylindrical and defines a circular cross-section. In preferred embodiments, the neck construction 92 will be seated within a periphery 98 of an internal air outflow tube 100 (FIG. 5). As can be seen in FIG. 5, in the particular construction shown there, the internal air flow tube 100 is terminated by the outlet tube construction 54. The neck construction 92 preferably extends or projects axially from remaining portions of the filter element 62 in a direction opposite or away from the media pack 64.

Referring again to FIG. 8, the centering construction 90 also includes a lip member 102. When constructed in the manner shown in FIG. 8, the lip member 102 will be at an outermost periphery of the centering construction 90. When the filter element 40 is properly oriented with respect to the aerosol separator arrangement 42, the lip member 102 will engage and circumscribe an outer periphery 104 of the housing 50 (FIGS. 2 and 5). The lip member 102 will help the user orient the filter element 62 properly onto the aerosol separator arrangement 42. The lip member 102 preferably extends or projects axially from remaining portions of the filter element 62 in a direction opposite or away from the media pack 64. Preferably, the lip member 102 will project in a same direction as the direction that the neck construction 92 projects.

Still in reference to FIGS. 6 and 8, the lip member 102 has secured thereto a seal member 110. The seal member 110 comprises a circular O-ring or gasket 112. When the filter element 40 is operably assembled with respect to the aerosol separator arrangement 42, and the axial sealing system 84 is actuated, as will be explained in more detail below, the gasket 112 will form a seal 114 between and against the housing 50 and the lip member 102 (FIG. 5).

Extending from the lip member 102 is an extension 116 bridging the lip member 102 and the neck construction 92. In the particular embodiment shown, the extension 116 includes a flat planar portion or region 118, a bend or angled surface 120, and a segment 122. In general, the planar region 118 and the segment 122 are angled relative to one another, as defined by the bend 120. The bend 120 can range through a number of angles, for example 45°–170°, typically 70°–110°, and in the particular example shown in FIG. 8, about 90°.

In addition to the seal member 110, the centering construction 90 holds or supports a second seal member 125. In the embodiment illustrated, the seal member 125 is oriented between the planar region 118 and the neck construction 92, in order to circumscribe or surround the neck construction 92. Attention is directed to FIG. 5. In FIG. 5, the seal member 125 is shown to be compressed between and against an outer wall 128 (FIG. 8) of the neck construction 92 and an inner wall 130 of the air flow tube 100. The compression of the seal member 125 between the wall 128 and the wall 130 forms a seal 132 between the filter element 62 and the airflow tube 100 of the aerosol separator arrangement 42.

In preferred constructions, the centering construction 90 is a single-piece construction, integral with the filter element 62. In the particular embodiment illustrated in FIGS. 6–8, the centering construction 90 is secured to the second end cap construction 74. One way to secure the centering construction 90 to the second end cap construction 74 is by welding the second end cap 74 to the centering construction 90 along the planar region 118. The integral construction of the filter element 62 and the centering construction 90 contributes to convenient, advantageous assembly. Because of the integral nature of the centering construction 90 with the filter element 62, the overall filter assembly 35 is no more than two pieces (other than the fastener used in the axial sealing system 84, that will be explained further below).

It should be noted that in alternate embodiments, the centering construction 90 would not need to be an integral part of the filter element 62. In alternate embodiments, the centering construction 90 could be a separate piece. The embodiment illustrated is preferred, in that it results in a single piece construction. In other embodiments, the centering construction 90 can be made to be a separate piece, and have the overall filter assembly 35 be more than two pieces. The single piece construction of the filter element 62 and centering construction is also preferred because it has a distinctive, ornamental, and eye-catching appearance.

In use, the centering construction 90 will fit or engage the aerosol separator arrangement 42, with the lip member 102 circumscribing the housing 50. The planar region 118 will cover an axial end 135 (FIG. 5) of the second stage filter 22. The planar region 118 will provide a sealing surface for receiving compression of an axial seal member 138 (FIG. 5) projecting or extending from the second stage filter 22. The neck construction 92 fits within and is circumscribed by the airflow tube 100 and an end cap 140 (FIG. 5) of the second stage filter 22.

The filter element 62 will be laterally spaced from the second stage filter 22. By "laterally spaced", it is meant that the first filter element 62 is spaced sideways from the second stage filter 22; in other words, the first filter element 62 and the second stage filter 22 are not radially aligned. Preferably, the first filter element 62 and the second stage filter 22 will be "stacked in axial alignment", meaning they are axially aligned by sharing a common central axis, but they are not radially aligned. Rather, they are stacked, either one on top of the other; or one next (laterally) to the other.

D. The Aerosol Separator Arrangement 42

Attention is directed to FIGS. 3–5 and 11. FIG. 3 is a schematic, rear elevational view of the aerosol separator arrangement 42 shown attached to the air cleaner 40; FIG.

Figure 11:
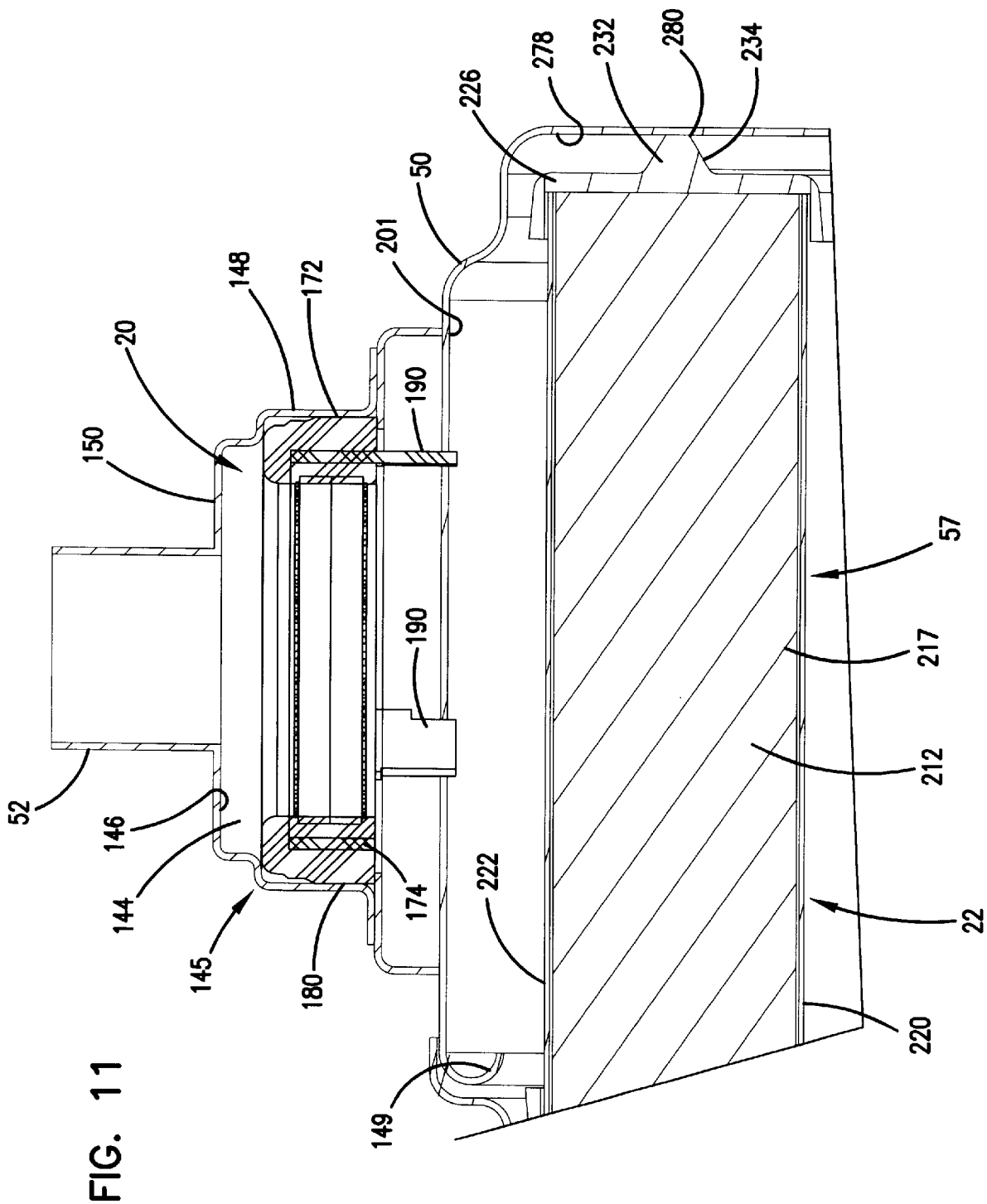
FIG. 11 is a fragmented, enlarged, schematic, cross-sectional view of the coalescer filter depicted in FIGS. 9 and 10 and depicted installed in the filter assembly taken along the line 11—11 of FIG. 3.

4 is a schematic, right end view of the aerosol separator arrangement 42; FIG. 5 is a schematic, cross-sectional view of the aerosol separator arrangement 42 also shown attached to the air cleaner 40; and FIG. 11 is an enlarged, fragmented, schematic, cross-sectional view of the coalescing filter 20 installed in the housing 50.

The aerosol separator arrangement 42, generally referenced herein, is a "multi-stage," arrangement. In general, the first stage of separation, which includes coalescer filter 20, is indicated generally at 144 (FIG. 1), and the second stage 22, which includes a polishing filter element, is indicated generally at 57 (FIGS. 5 and 11).

Figure 9:
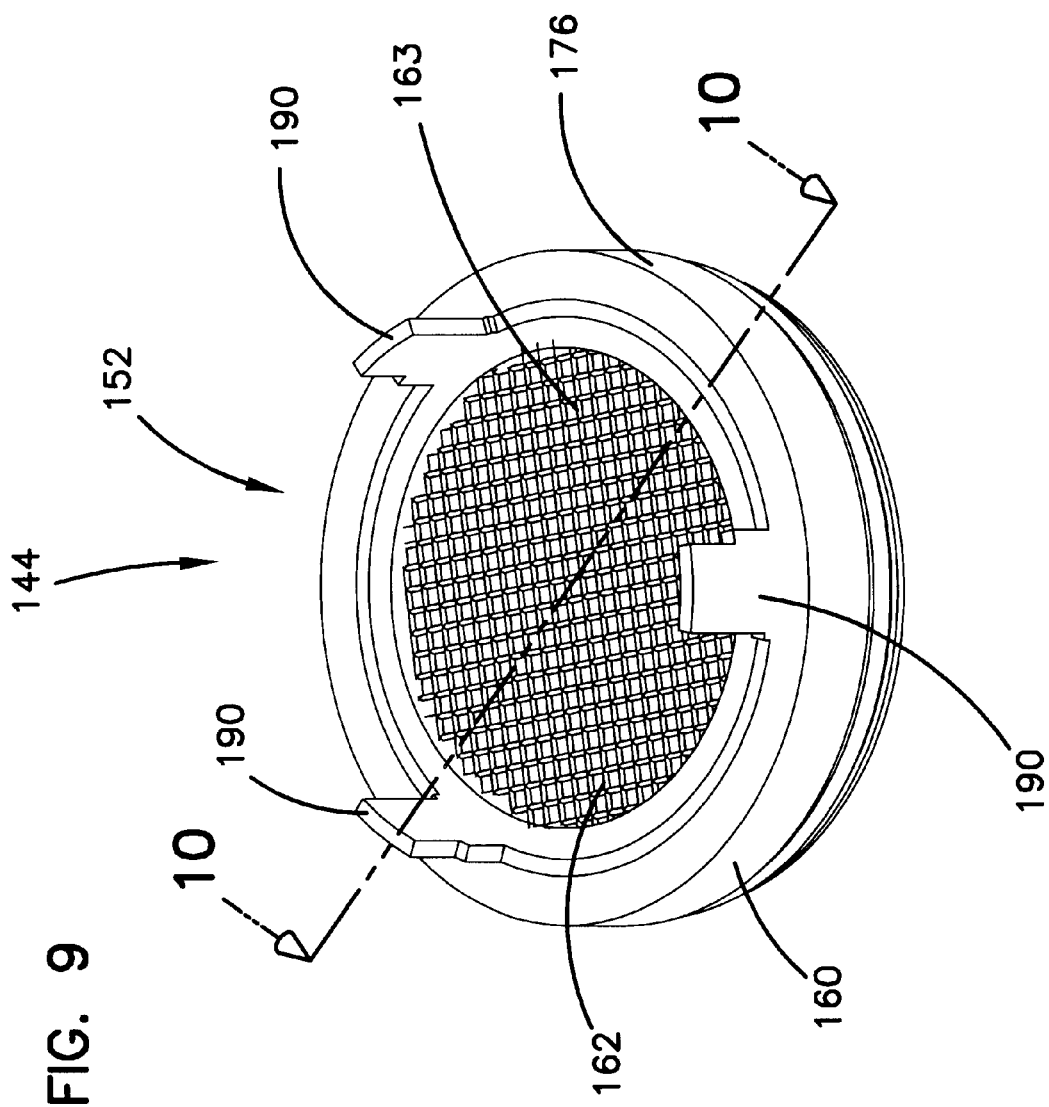
FIG. 9 is a schematic, perspective view of an embodiment of a coalescer filter used in the aerosol separator arrangement of the filter assembly depicted in FIGS.
Figure 10:
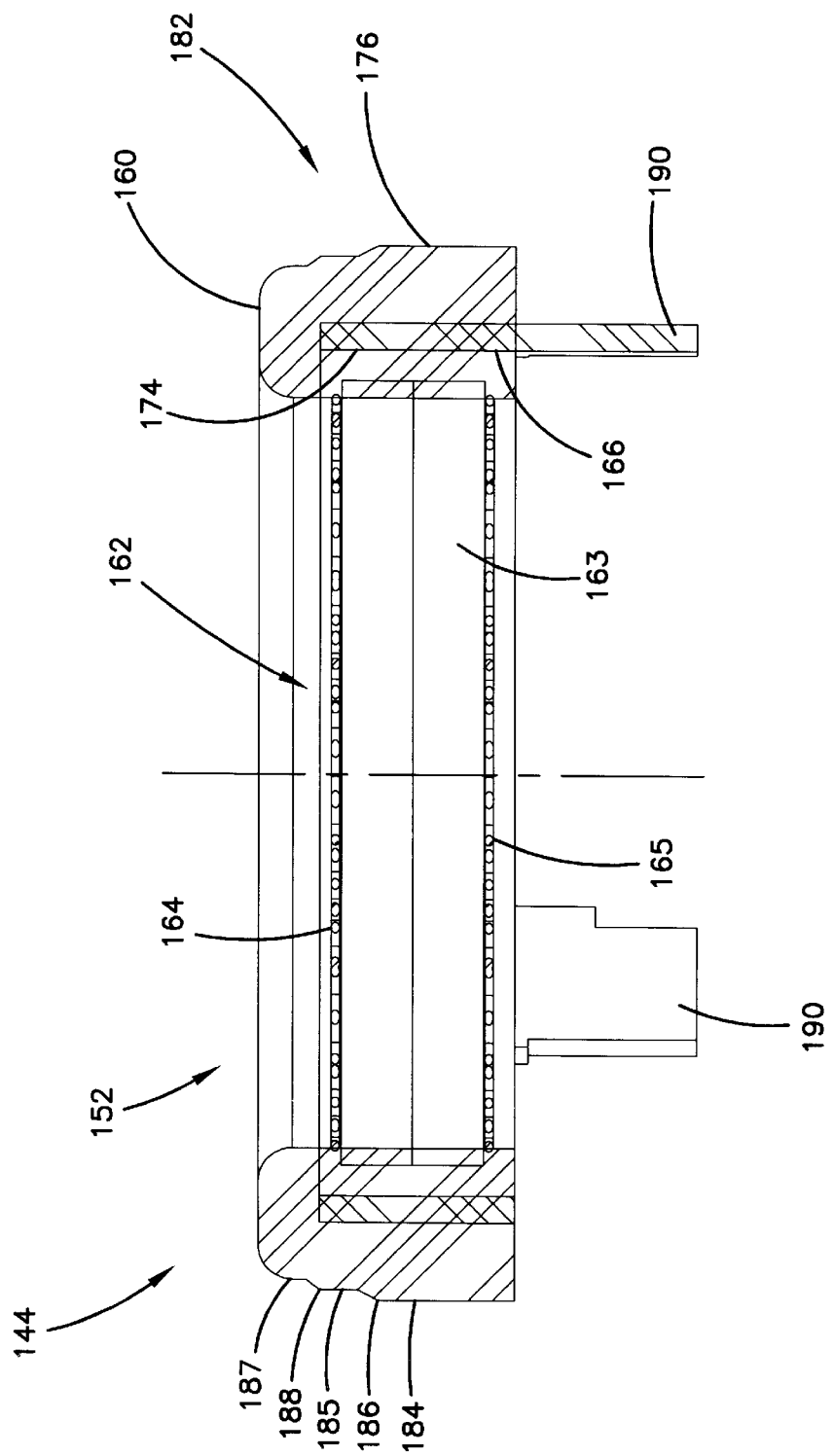
FIG. 10 is a schematic, cross-sectional view of the coalescer filter depicted in FIG. 9 and taken along the line 10—10 of FIG. 9.

In general, the aerosol separator arrangement 42 is constructed and arranged to separate and remove an entrained liquid, such as oil, from a gas flow and to remove particulates from the gas flow. While a variety of constructions are contemplated, in the particular embodiments shown in FIGS. 3–5, the aerosol separator arrangement 42 generally includes housing 50, having an inlet tube construction 52 and outlet tube construction 54; second stage air cleaner element 57; and separator construction 144 (FIGS. 9–11).

In the particular embodiment illustrated, generally, blow-by gas enters the aerosol separator arrangement 42 through the inlet tube construction 52. The separator construction 144 removes the entrained liquid from the blow-by gas. In particular, as the gas stream passes through the separator 144, two material streams are generated: a somewhat filtered or purified gas stream and a liquid stream. The gas stream is directed into the second stage air cleaner 57 for further particulate removal. The filtered gas stream enters the outlet tube construction 54, where it is joined by the gas stream exiting the air cleaner 40, and exits the aerosol separator arrangement 42 through the outlet tube construction 54.

The separator construction 144 also operates as a prefilter for carbon contaminants carried in the gas stream. As the liquid stream is drained from the arrangement 42, it provides some self-cleaning of the separator because the liquid stream will carry therein a portion of the trapped carbon contaminant.

In general, the separator construction 144 comprises material in which the fine oil droplets carried within the gas stream will tend to collect and coalesce into droplets. In general, preferably the support or substrate material in the separator construction 144 is selected and configured in a manner such that the combination of the separator construction 144 and the collected oil droplet stream will operate as a prefilter for contaminants (especially carbon particles) also carried in the gas stream. The contaminants or carbon particles will tend to become entrained in the liquid flow, leaving the arrangement through a drain hole. Thus, to some extent, in a system such as that described herein, the separator construction 144 is self-cleaning. Alternatively stated, the continuously collected oil phase will tend to wash some of the continuously collected carbon particle phase out of the separator construction 144.

For typical systems, it is anticipated that the separator construction 144 will be designed such that with a typical gas flow therethrough, a substantial life for the separator 144 will, in part, result from the washing effect. However, it is also anticipated that the system will not be "tuned" with an effort toward optimal operation through self-cleaning. That is, it is anticipated that the separator 144 will, in preferred systems, be configured for periodic regeneration resulting from removal of filter media or coalescing material positioned therein and either cleaning or replacement. Alternatively phrased, it is foreseen that in typical applications the material (media) of the coalescer will be chosen with a focus on achievement of high-efficiency aerosol removal, preferably at least 20%, more preferably at least 25–50%, by weight in typical use. This will also result in substantial carbon particle removal. The carbon particle removal will in part be facilitated by the fact that substantial amounts of the liquid stream will coalesce within the media, and the liquid stream will help trap the carbon material. It is foreseen that if the coalescer material is selected (tuned) to achieve highest efficiency carbon particle removal, especially on the order of at least about 60%, it might offer too great a restriction to gas flow to be fully desirable as a coalescer filter.

Figure 4:
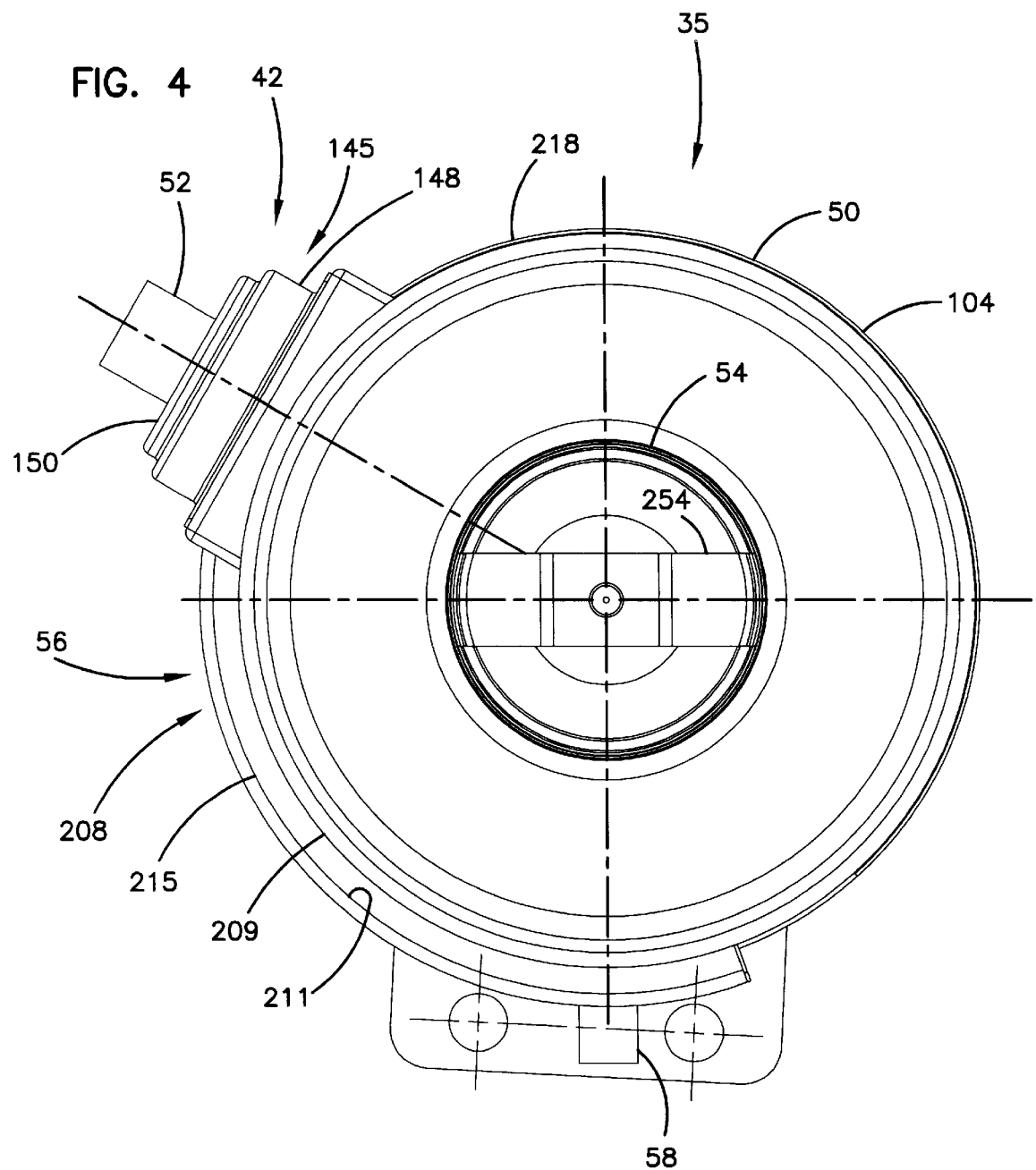
FIG. 4 is a schematic, right end view of the filter assembly depicted in FIG. 3.

In the particular embodiment illustrated in FIGS. 3–5, the housing 50 includes the inlet tube construction 52, the outlet tube construction 54, the separator construction 144 (FIG. 11), drain construction 56, and second stage air cleaner construction 57.

Referring to FIGS. 3 and 11, the inlet tube construction 52 is generally tubular and has a circular cross-section. Typically, the inlet tube construction 52 is connected to a blow-by vent, such as the blow-by vent 18 of FIG. 1, of an engine, such as the engine 14 of FIG. 1, by a hose, duct, or some other suitable means. Preferably, the inlet tube construction 52 is integral with a separator construction housing 145.

Attention is directed to FIG. 11. The particular separator construction housing 145 depicted has a peripheral side wall 148 that is generally tubular and has a circular cross-section. The inlet tube construction 52 is connected to the peripheral side wall 148 by an exterior wall 150. The peripheral side wall 148 and the separator exterior wall 150 define a receiver or separator chamber 146. Typically, the gas stream passes through the inlet tube construction 52 into the separator chamber 146. Generally, the diameter of the separator chamber 146 is larger than the diameter of the inlet tube construction 52 such that the blow-by gas stream expands as it enters the separator chamber 146. The expansion of the gas stream reduces the velocity of the gas stream, aiding in the separation of the entrained liquid.

In the particular embodiment illustrated, the separator chamber 146 is constructed and arranged to receive separator construction 144, for example, a coalescer filter construction 152. Attention is directed to FIG. 9. FIG. 9 is a perspective view of a coalescer filter construction 152 suitable for use in the particular embodiment illustrated in FIG. 5. The particular coalescer filter construction 152 depicted has a circular cross-sectional area with a diameter. Preferably, the diameter of the coalescer filter construction 152 is approximately equal to an inside diameter of the separator chamber 146.

Attention is directed to FIGS. 9 and 10. FIG. 10 is a cross-section of the coalescer filter construction 152 taken along line 10—10 of FIG. 9. In the particular embodiments illustrated in FIGS. 9 and 10, the coalescer filter construction 152 includes a frame construction 160 and a media pack 162. In general, the frame construction 160 provides structural integrity to the separator construction 152 to prevent radial or axial collapse of the media pack 162 due to forces exerted by the blow-by gas stream. The media pack 162 causes the entrained liquid to separate from the gas stream. The frame construction 160 also prevents radial leakage of the gas stream around the outside circumference or periphery 176 of the coalescer filter construction 152. In other words, the frame construction 160 causes the gas stream to pass through the media pack 162 rather than around the outer periphery 176 of the separator construction 152.

In preferred arrangements, the media pack 162 of the coalescer filter construction 152 comprises a material appropriate for coalescing hydrophobic aerosol carried within a gas stream passing through the inlet tube construction 52 (FIG. 2, 3, 4). Preferably, the media pack 162 comprises polyester fibrous media 163, oriented in a generally circular patch or configuration. The media 163 is held and encapsulated by the frame construction 160, which is preferably a single or unitary molded housing molded around the media 163.

Referring now to FIG. 10, the media pack 162 preferably includes first and second liners or screens 164, 165. The screens 164, 165 are positioned on both the upstream and downstream side of the media 163 and help to support the media 163. The screens 164, 165 may comprise perforated metal, expanded metal, or nonmetallic materials such as plastic or carbon-filled nylon. Preferably, nonmetallic materials, such as carbon-filled nylon, are used such that the coalescer filter construction 152 is readily incineratable. Preferably, the coalescer filter construction 152 will comprise at least 90%, more preferably at least 95%, and most preferably up to 100% nonmetallic materials.

Preferably, the coalescer filter construction 152 includes a support structure 166 molded within the frame construction 160. The support structure 166 functions to provide a backstop to the compression of the frame construction 160 with an inner wall 172 (FIG. 11) of the housing 50. In the particular embodiment shown in FIG. 10, the support structure 166 preferably comprises a rigid support ring 174 molded within the frame construction 160. The support ring 174 preferably comprises a circular band embedded within the frame construction 160 and spaced from the outermost periphery 176 of the frame construction 160.

Referring to FIG. 11, when the coalescer filter construction 152 is positioned within the separator chamber 146, the frame construction 160 is compressed between and against the support ring 174 and the inner wall 172 of the separator chamber 146 to form a radial seal 180 therebetween.

In FIG. 10, it can be seen that the frame construction 160 preferably includes a nonlinear profile at the periphery 176. In particular, the periphery 176 includes a step construction 182. In the particular embodiment shown, there is a first region of largest diameter at 184. This first region of largest diameter corresponds to a region that is furthest downstream, when oriented within the separator arrangement 42. Adjacent to the first region 184, is a second region 185. The second region 185 has a diameter smaller than the first region 184 and is immediately adjacent to the first region 184. As such, there is a step 186 in between these two regions 184, 185. Most upstream is a region of smallest diameter 187. The third region 187 has a diameter that is smaller than the second region 185, and, of course, smaller than the first region 184. The third region 187 is immediately adjacent to the second region 185, and due to the differences in diameter, there is a step 188 formed therebetween. This stepped construction 182 helps with the insertion and formation of the radial seal 180 between the coalescer filter construction 152 and the inner wall 172 of the separator chamber 146 (FIG. 11).

Preferably, the frame construction 160 is constructed of compressible material, for example, foamed polyurethane. One usable foamed polyurethane is described in U.S. Pat. No. 5,669,949, herein incorporated by reference. When installing the separator construction 152 in the separator chamber 146 (FIG. 11) to form the radial seal 180 (FIG. 11), there preferably is a compression of at least 10%, no greater than about 50%, more preferably between 15 and 40%, and most preferably about 20% against the inner support ring 174.

Still referring to FIGS. 9 and 10, note that the media 163, in the embodiment shown, comprises a circular region or patch held within the frame construction 160. As the separator construction 152 coalesces liquids, such as oil, from gas streams coming through the inlet tube construction 52, coalesced liquid runs off of the media 163 and to a liquid drain 189 (FIG. 5) of the drain construction 56. The drain construction 56 is described in more detail below.

Referring now to FIG. 9, preferably, the support ring 174 includes a plurality of projecting tabs 190 axially projecting outside of the frame construction 160 to depend therefrom. In the particular embodiment illustrated, there are at least 2 tabs, preferably 3 or more tabs 190. The tabs 190 are used to remove the coalescer filter construction 152 from the separator chamber 146 (FIG. 11) for cleaning or replacement.

It should be understood that the coalescer filter construction 152 may be a variety of shapes and sizes. For example, the frame construction 160 need not be circular, but can be other configurations. The coalescer filter construction 152 may also include an alignment system for properly orientating the coalescer filter construction 152 within the separator chamber 146 (FIG. 11). Of course, the separator construction housing 145 could be positioned in other parts of the aerosol separator arrangement 42.

Referring back to FIG. 3, the peripheral side wall 148 is preferably integral with an access plate 200. In the particular embodiment illustrated, the access plate 200 is generally rectangular in cross-section. The housing 50 includes a generally rectangular perimeter wall 202 constructed and arranged to receive the access plate 200. Preferably, the perimeter wall 202 is integral with the housing 50. The access plate 200 is secured to the perimeter wall 202 by fastening devices 204, such as screws or bolts. The access plate is designed to allow access to the housing 50 through the access chamber. This allows the coaleser filter construction 152 to be serviced and maintained. For example, a user can clear any occlusions that may occur within the coalescer filter construction 152.

Still in reference to FIG. 3, the housing 50 also includes a drain track 208. The drain track 208 provides a pathway from the coalescer filter construction 152 to the liquid drain 189 (FIG. 5) such that the liquid stream (with any entrained solids) is directed from the separator construction 144 to the liquid drain 189 by gravity and is removed from the aerosol separator arrangement 42 through the liquid flow outlet 58. For example, the material may be recycled to the crankcase to be reused. Alternatively, it may be collected separately for disposal.

Referring now to FIG. 4, in the embodiment shown, the drain track 208 includes an outer wall 215 partially circumscribing the surface 209 of the wall 218 of the housing 50 and extending between the separator receiver or chamber 146 (FIG. 11) and the liquid drain 189 (FIG. 5). In the orientation illustrated, the gas stream enters the separator arrangement 42 at the inlet tube construction 52. The separator construction 144 separates the gas stream into a liquid stream and a gas stream. The liquid stream follows the drain track 208 along the surface 209 by gravity to the liquid drain 189 (FIG. 5), where the liquid stream exits the separator arrangement 42 through the outlet port 58. The gas stream also follows the drain track 208 between the inner surface 209 and an opposite inner surface 211 of the wall 215. The gas stream enters a dirty airflow plenum 201 at an inlet 213 (FIG. 5) defined by the wall 218 of the housing 50 between the second stage air cleaner 57 (FIG. 5) and the wall 215 of the drain track 208. This gas stream is then directed to the second stage air cleaner 57.

Referring now to FIG. 5, preferably, the second stage air cleaner 57 is constructed and arranged to remove particulates from the gas stream passing therethrough. While a variety of constructions are contemplated, in the particular embodiments shown, the second stage air cleaner 57 comprises a filter element 210 having a media pack 212 arranged in a tubular construction, such that dirty air flows through the media pack 212 from the airflow plenum 201 to an open filter interior 214, defining a clean air chamber 216.

The media pack 212 can include a variety of types of media. In the particular embodiment illustrated, the media pack 212 comprises pleated media 217. Usable media material is described in further detail below.

Supporting the pleated media 217 is an inner liner 220 and an outer liner 222. When constructed as shown, the inner and outer liners 220, 222 will be cylindrical constructions, typically constructed from metal, such as expanded metal or perforated metal.

When constructed as shown, the filter element 210 will include first and second end cap constructions 140, 226. Preferably, the pleated media 217 extends between the first and second end caps 140, 226 and is potted therewithin.

The first end cap construction 140 includes first seal member 138. The first seal member 138 comprises a projecting gasket 230, extending from the axial end of the end cap 140 and having a generally triangular cross-section. Likewise, the second end cap construction 226 includes a second seal member 232. The second seal member 232 comprises a projecting gasket 234, extending from the axial end of the end cap 226 and having a generally triangular cross-section.

The housing preferably includes a system for ensuring that liquid, such as oil, does not easily spill when servicing the assembly 35. In the embodiment shown, the exterior wall 218 of the housing 50 has a hook portion 149 at an end adjacent to the air cleaner 40. The hook portion 149 is constructed and arranged to prevent liquid, such as oil, that may collect in the separator arrangement 42, from spilling out.

Still referring to FIG. 5, the gas stream enters the airflow plenum 201 at inlet 213. The gas stream passes through the media pack 212 into a clean air chamber 216 circumscribing the airflow tube 100. The airflow tube 100 is non-porous (with the exception of an outlet or aperture 240), and the gas stream is prevented from entering the airflow tube 100 except at the outlet 240. The gas stream travels within the clean air chamber 216 around the airflow tube 100 and exits the clean air chamber 216 at the aperture 240, where the gas stream mixes with the gas stream from the air cleaner 40 in chamber 101 and exits the outlet tube construction 54. While a single aperture 240 is shown, a plurality of apertures could be used.

The aperture 240 is configured and arranged to limit the gas stream flow through the second stage air cleaner 57. Limiting the gas stream flow prevents excessive fluid flow from being sucked from the engine crankcase, and ensures that enough outside air reaches the engine for proper combustion. The gas stream flow from the second stage air cleaner 57 can be limited, for example, by properly sizing the aperture 240 to allow for the proper gas stream flow.

E. The Axial Seal System 84

In order to have effective operation and filtering in the filter assembly 35 shown, the filter assembly 35 will need a sealing system between the filter element 62 and the aerosol separator arrangement 42; and between the aerosol separator arrangement 42 and the housing 50, to prohibit unfiltered air from bypassing the media pack 64 or media pack 212 and enter the clean air chambers 68 and 101. In the filter assembly 35 shown, axial sealing system 84 is used to provide this sealing function.

In general, in reference to FIG. 5, the axial sealing system 84 includes a yoke construction 250, a fastener 252, locking surface 80, axial seal member 138, and axial seal member 232.

The yoke construction 250 includes a yoke 254 that is secured to the aerosol separator arrangement 42. In the embodiment shown, the yoke 254 is secured to the aerosol separator arrangement at securement points 258 along the interior 96 of the airflow tube 100. The yoke 254 extends from the securement points 258, through the clean air chamber 101 in the airflow tube 100, and projects into the open filter interior 68 of the filter element 62. The yoke 254 defines an end bight 260. The bight 260 includes a threaded aperture 262 for receiving the fastener 252.

The fastener 252, in the embodiment shown, is a wing nut 265 having a head 270 and threaded shaft 272. An 0-ring gasket 268 is oriented between the head 270 of the wing nut 265 and the locking surface 80 of the end cap 72.

In use, the wing nut 265 is inserted in the aperture 82 of the end cap 72 and through the aperture 262 of the yoke 254. The wing nut 265 is turned and tightened in the threads of the aperture 262 of the yoke 254. As the wing nut 265 is turned within the threaded aperture 262, the wing nut 265 will exert an axial force on the yoke 254.

This axial force will translate into: (a) an axial force between the planar region 118 of the centering construction 90 of filter element 62 and the axial seal member 138 of the second stage air cleaner 57; and (b) an axial force between the inner surface 278 of the housing 50 and the axial seal member 232 on the end cap 226. Eventually, the axial forces will cause enough compression of the axial seal member 138 with the centering construction 90 and the axial seal member 232 with the inner surface 278 of the housing 50, that an axial seal 274 will be formed between the centering construction 90 and the end cap 140 of the second stage air cleaner 57; and an axial seal 280 will be formed between the inner surface 278 of the housing 50 and the end cap 226 of the second stage air cleaner 57. The axial seals 274 and 280 will prevent an unintended amount of air flow from bypassing the media pack 64 and the media pack 212 of the second stage air cleaner 57 and proceed directly to the clean air chamber 68 and 101, during normal operation.

F. Example Operation

In operation, the filter assembly 35 works as follows: an engine, such as a 600 horse power or at least a 400 horse power engine, for example a 3126 HEUI 450 horsepower engine, will include an air intake system and a turbo. Air will be drawn through the airflow tube 100 due to the turbo. Unfiltered air will be drawn from the atmosphere through pleated media 70 of the air cleaner 40. The air will flow through the pleated media 70 and into the open filter interior 66 and the clean air chamber 68. The unfiltered air will not be allowed to bypass the filter media 70, due to the axial seals 274, 280. The filtered air then proceeds through the outlet path 94 of the centering construction 90 and into the clean air chamber 101 of the airflow tube 100. From there, the filtered air is taken into the turbo and eventually into the engine crank case for combustion.

During combustion, blow-by gases from the engine crank case are exhausted through a blow-by vent and into the gas flow inlet port or tube construction 52. The blow-by gas is passed through the coalescer filter 152. The coalescer filter 152 separates liquids, with any entrained solids, from the rest of the gas stream. The liquid flows off of the coalescer media 162, down the drain construction 56, and out through the liquid flow outlet port 58. This liquid material is often oil, and may be recycled to the crank case to be reused.

The gas stream that is not coalesced by the coalescer filter 152 flows into the gas flow plenum 201 through the inlet 213. The gas flow moves through the plenum 201 to the second stage air cleaner 57. The gas flows through the filter media 217 and into the filtered plenum or region 216. The gas is not allowed to bypass the filter media 217 due to the axial seals 274, 280. From the filtered gas plenum 216, the gas flows through the aperture 240 into the clean air chamber 101 defined by the air flow tube 100. There, the air mixes with the air being taken in through the air cleaner 40. This combination of air is then drawn into the turbo and eventually into the engine crank case.

On a 450 horsepower 3126 HEUI engine, the filter assembly 35 will operate for at least 250 hours and up to 500 hours, before requiring service or change out. The air cleaner 40 will operate at an efficiency of at least 85%, typically at least 90%. By "efficiency", it is meant efficiency measured according to SAE J726, using fine or coarse dust ISO.

In a 450 horsepower 3126 HEUI engine, there will be about 7 to 10 cubic feet per minute of blow-by flow. There will be about 400 to 1000 cubic feet per minute of air flow through the air cleaner 40. The face velocity of the air cleaner will be at least 50 feet per minute, typically 60–100 feet per minute. The face velocity through the second stage air cleaner 57 will be at least about 0.1 feet per minute, no greater than about 5 feet per minute, and typically about 0.3–0.6 feet per minute.

G. Servicing and Change-out

After a period of operation, the filter assembly 35 will require servicing. The servicing may be indicated by a restriction indicator device that indicates the restriction through the filter assembly 35 has become higher than a desired amount, due to, for example, occlusion of the media 70 of the filter element 62, or the media 217 of the second stage air cleaner 57, or the coalescer filter 152. To service the filter assembly 35, the filter element 62 is removed from the aerosol separator arrangement 42. This is done by breaking the axial seals 278, 280 by unscrewing the wing nut 265 from the yoke 254. As the wing nut 265 is loosened from the yoke 254, axial forces between the filter element 62 and the aerosol separator arrangement 42 will be decreased. Eventually, the wing nut 265 will be completely separated from the yoke 254. This will allow the filter element 62 to be removed from the aerosol separator arrangement 42. The filter element 62 can be grasped by the user and pulled from the aerosol separator arrangement 42. While doing this, the neck construction 92 is pulled out of the airflow tube 100. The filter element 62 can then be disposed of. In some constructions, the filter element 62 may comprise at least 90%, for example 95–100% non-metallic materials by weight, such that it is readily incinerateable.

When the filter element 62 is removed from the aerosol separator arrangement 42, this will expose an opening in the housing 50. The second stage air cleaner 57 may then be removed from the housing 50 by grasping the filter element 210 and pulling it through the opening at the top of the housing 50. That is, the filter element 210 is pulled out over the air flow tube 100, until it is separated from the housing 50. The filter element 210 may then be disposed of. In some constructions, the filter element 210 will be constructed of non-metallic materials, for example, at least 90%, and sometimes 95–100% non-metallic materials by weight. The filter element 210 can then be incinerated.

After the filter element 210 is removed from the housing 50, the coalescer filter construction 152 is exposed. The coalescer filter construction 152 can be removed from the housing 145 by grasping the tabs 190 and pulling the coalescer filter construction 152 from the chamber 146. This breaks radial seal 180 between the coalescer filter construction 152 and the wall 172 of the housing 145. The coalescer filter construction 152 is then removed from the housing 50 by passing it through the region between the air flow tube 100 and the outer wall 104 of the housing 50, and out through the opening exposed by the missing filter element 62. The coalescer filter construction 152 may then be disposed of. In some constructions, the coalescer filter construction 152 will be made of at least 90%, and sometimes 95–100% non-metallic materials by weight. As such, the coalescer filter construction 152 can be incinerated.

A second, new coalescer filter construction 152 is then oriented within the chamber 146. This is done by passing the coalescer construction 152 in the region between the air flow tube 100 and the outer housing wall 50. The coalescer filter construction 152 is then pushed into the chamber 146 such that the sealing region 182 is compressed between and against the ring 174 and the inner wall 172 of the chamber 146 to form the radial seal 180 therebetween.

A second, new filter element 210 is then inserted into the housing 50. This is done by orienting the new filter element 210 around the air flow tube 100 and inserting the filter element 210 into the housing 50.

A second, new filter element 62 is then oriented to be laterally spaced from and stacked in coaxial alignment with the filter element 210. The new filter element 62 is stacked or oriented on top or over the filter element 210, by inserting the neck construction 62 within the air flow tube 100. The lip member 102 will circumscribe the outer peripheral wall 104 of the housing 50. The seal member 125 will be oriented between the outer wall 128 of the neck construction 92 and the inner wall 130 of the air flow tube 100. The seal member 110 will be oriented between the housing 50 and the lip member 102.

The axial sealing system 84 will then be actuated to form a seal between the housing 50 and the second stage filter 48; and between the filter element 62 and the filter element 210. This is done by inserting the wing nut 265 into the aperture 262 of the yoke 254 and turning the wing nut 265. As the wing nut 265 threadably engages the yoke 254, axial forces are directed: (a) between the axial seal member 234 and the inner surface 278 of the housing 50 to create axial seal 280; and (b) between the planar region 118 of the centering construction 90 and the axial seal member 138 to form axial seal 274. Seals are also formed with the seal members 125 and 110. The filter assembly 35 is then ready to be used with an engine.

H. Example Materials

In this section, examples are provided of usable materials. The particular choice for any given material will vary, depending on the filtering application. In other words, the particular material selected for the systems usable herein will be decided upon by the system designer based on the system requirements. A variety of materials are possible. The following section provides examples of materials that have been found to be suitable.

The housing 50 can be made from rolled steel, aluminum, or plastic (nylon).

The media 163 of the coalescer filter 152 can be non-pleated, non-cylindrical, fibers having an average fiber size of about 12.5 micron and a percent solidity, free state, of no greater than about 1.05%.

The housing 182 of the coalescer 152 can be a soft, compressible material, such as foamed polyurethane. The housing 182 may comprise a variety of polymeric materials moldable to form an appropriate gasket member, with media 163 potted therein. One useful material is polyurethane such as that described in commonly assigned U.S. Pat. No. 5,669,949 for end cap 3, hereby incorporated by reference. There is no particular preference, provided that a seal is formed in the proper location under compression. One usable material will be a soft polymeric material, such as foamed urethane. One example usable material includes foamed polyurethane, processed to an end product (soft urethane foam) having an "as molded" density of 14–22 pounds per cubic foot (lbs/ft$^3$) and that exhibits a softness such that a 25% deflection requires about a 10 psi pressure. In some embodiments, the "as molded" density varies from the 14–22 lbs/ft$^3$ range. Foamed polyurethanes are available from a variety of sources, such as BASF Corporation of Wyandotte, Mich. One example of a foamed polyurethane comprises a material made with I35453R resin and I3050U isocyanate, which is sold exclusively to the assignee Donaldson by BASF Corporation. The polyurethane comprises a material made with 135453R resin and 13050U isocyanate. The materials should be mixed in a mix ratio of 100 parts 135453 resin to 36.2 parts 13050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material 135453R has the following description:
(a) Average molecular weight
  1) Base polyether polyol=500–15,000
  2) Diols=60–10,000
  3) Triols=500–15,000
(b) Average functionality
  1) total system=1.5–3.2
(c) Hydroxyl number
  1) total systems=100–300
(d) Catalysts
  1) amine=Air Products 0.1–3.0 PPH
  30 2) tin=Witco 0.01–0.5 PPH
(e) Surfactants
  1) total system=0.1–2.0 PPH
(f) Water
  1) total system=0.03–3.0 PPH
(g) Pigments/dyes
  1) total system=1–5% carbon black
(h) Blowing agent
  1) 0.1–6.0% HFC 134A.

The I3050U isocyanate description is as follows:
(a) NCO content—22.4–23.4 wt %
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

The materials I35453R and I3050U are available from BASF Corporation, Wyandotte, Mich. 48192.

The support ring 174 and screens 164, 165 can be constructed of plastic, such as carbon filled nylon.

The filter media 217 for the filter element 210 can be a synthetic glass fiber filter medium, coated and corrugated to enhance performance in ambient air-oil mist conditions. One material useful is a synthetic glass fiber filter medium, which is coated and corrugated to enhance performance in ambient air-oil mist conditions. The synthetic glass fiber filter media may be coated with a low surface energy material, such as an aliphatic fluorocarbon material, available from 3M of St. Paul, Minn. Prior to coating and corrugating, the media has a weight of at least 80 pounds/3000 sq. ft; no greater than about 88 pounds/3000 sq. ft; typically in a range from about 80–88 pounds/3000 square feet (136.8±6.5 grams per square meter). The media has a thickness of 0.027±0.004 inches (0.69±0.10 millimeters); a pore size of about 41–53 microns; a resin content of about 21–27%; a burst strength, wet off the machine of 13–23 psi (124±34 kPa); a burst strength wet after 5 minutes at 300° F. of 37±12 psi (255±83 kPa); a burst strength ratio of about 0.30–0.60; and a permeability of 33±6 feet per minute (10.1±1.8 meters per minute). After corrugating and coating, the media has the following properties: corrugation depth of about 0.023–0.027 inches (0.58–0.69 millimeters); a wet tensile strength of about 6–10 pounds per inch (3.6±0.91 kilograms per inch); and a dry burst strength after corrugating of no less than 30 psi (207 kPa).

The media 70 may comprise a pleated media, or alternatively, a depth media. If pleated media is used, in general, paper or cellulose fiber media or media comprising cellulose fibers and synthetic fibers can be used. The media may be treated, for example with oiling as described in U.S. Pat. No. 5,423,892, incorporated herein by reference. Or, for example, the media may be treated with expanded polytetfloroethylene (PTFE). Also, as explained in U.S. Pat. No. 5,423,892, incorporated herein by reference, the efficiency of barrier media such as paper or cellulose can be modified in some instances by applying to a surface of the media, a deposit of relatively fine fibers, typically less than 5 microns and in many instances submicron sized (average) fibers. Alternatively, if depth media is used, media as described in U.S. Pat. No. 5,423,892, may be used.

One suitable media for media 70 is pleated cellulose media with the following properties: basis weight: 70.0±4.0 lbs/3000 ft$^2$ (114±6.5 g/m$^2$); thickness: 0.032±0.003" (0.81±0.08 mm); Frazier permeability: 167±17 ft./min. (50.9±5.2 m/min.); Pore size 100±5 microns; Dry tensile strength: 5.0±0.5 kg/in (11±1 lb/in); Burst strengths: A. Wet Off Machine: 7±1.5 psi (48±10 kPa); B. Wet w 3 minutes at 160 C: 10±1.5 psi (69±10 kPa); C. % Cure (A/B) X100% about 70–90%.

I. Example Construction

In this section, examples are provided of a set of operating specifications.

These are intended as an example. A wide variety of alternate sizes can be used.

|  | at least (in) | no greater than (in) | typically (in) | for example (in) |
|---|---|---|---|---|
| filter element 62 diameter | 3 | 30 | 5–20 | 8–12 |
| filter element 62 length | 2 | 30 | 3–15 | 4–5 |
| filter element 62 pleat no. (stated in pleat number) | 50 pleats | 300 pleats | 60–200 pleats | 100–150 pleats |
| filter element 62 pleat depth | 0.25 | 20 | 0.5–10 | 1–3 |
| neck 92 diameter | 1 | 30 | 2–10 | 3–5 |
| second stage element 210 diameter | 3 | 30 | 5–20 | 7–1 1 |
| second stage element 210 length | 2 | 30 | 3–15 | 5–7 |

-continued

|  | at least (in) | no greater than (in) | typically (in) | for example (in) |
|---|---|---|---|---|
| second stage 210 pleat depth | 0.25 | 20 | 0.5–10 | 1–2 |
| airflow tube 100 diameter | 1 | 30 | 2–10 | 3–5 |
| airflow aperture 240 diameter | 0.1 | 3 | 1–2 | 1.25 |
| housing 50 length | 2 | 35 | 3–20 | 5–7 |
| housing 50 diameter | 4 | 35 | 5–25 | 8–12 |
| gas inlet 52 diameter | 0.05 | 2 | 0.07–1 | 0.1–0.15 |
| liquid outlet 58 diameter | 0.05 | 2 | 0.1–1 | 0.15–0.25 |
| coalescer housing 182 diameter | 0.5 | 10 | 1–5 | 2–4 |
| coalescer media 163 diameter | 0.25 | 9 | 0.5–4 | 1–3 |
| housing 182 thickness | 0.1 | 5 | 0.25–3 | 0.5–1 |
| thickness of housing 182 plus the tabs 190 | 0.25 | 6 | 0.5–4 | 1–2 |

The coalescer media 163 is configured to have an upstream surface area of no more than about 10%, typically no more than about 2%, more typically no more than about 0.5%, (for example, about 0.1–0.15%) of the upstream surface area of the media 217 of the second stage filter element 210. The ratio of the upstream surface area of the coalescer filter to the upstream surface area of the media 217 is about 1:500–1:800; for example, about 1:600–1:700 (about 1:650).

The aperture 240 of the airflow tube 100 defines an open area that is no greater than 50% of the open area of the airflow tube 100, typically no greater than 40%, for example, about 10–25%. By "open area" of the aperture 240, it is meant the total area defined by the aperture 240, or if a plurality of apertures are used, the total areas defined by all of the apertures (if circular, the open area would be calculated by $\pi r^2$). The open area of the airflow tube 100, if circular, would be calculated by $\pi r^2$.

Other embodiments of the invention will be apparent to those skilled in the art from consideration of the specification and practice of the invention disclosed herein.

We claim:

1. A filter arrangement comprising:
   (a) a tubular first filter element having a first media pack defining a first open filter interior and an air flow outlet;
      (i) said air flow outlet being in gas flow communication with said first open filter interior;
   (b) a housing construction having a gas flow inlet and a gas flow outlet;
      (i) said air flow outlet of said first filter element being in gas flow communication with said gas flow outlet;
   (c) a coalescer filter element oriented in said housing construction in fluid communication with said gas flow inlet; and
   (d) a tubular second filter element oriented in said housing construction having a second media pack defining a second open filter interior;
      (i) said second open filter interior being in gas flow communication with said gas flow outlet;
      (ii) said second filter element being laterally spaced from said first filter element.

2. A filter arrangement according to claim 1 wherein:
   (a) said housing construction further includes a drain construction having a liquid flow outlet in liquid flow communication with said coalescer filter element.

3. A filter arrangement according to claim 2 further including:
   (a) a sealing system constructed and arranged to create a first seal between said first filter element and said second filter element.

4. A filter arrangement according to claim 3 wherein:
   (a) said sealing system is constructed and arranged to create a second seal between said second filter element and said housing construction.

5. A filter arrangement according to claim 4 wherein:
   (a) said first filter element includes first and second end caps with said first media pack extending therebetween;
      (i) said first end cap having a bearing surface and defining a fastener-receiving aperture;
   (b) said sealing system includes a yoke construction secured to said housing construction; and a fastener removably connecting said yoke construction and said first end cap.

6. A filter arrangement according to claim 2 wherein:
   (a) said housing construction includes an outer surrounding wall; and a coalescer housing;
      (i) said coalescer housing defining a chamber constructed and arranged to hold said coalescer filter element between said gas flow inlet and said outer surrounding wall; and
      (ii) said drain construction includes a track extending between said coalescer housing and said liquid flow outlet.

7. A filter arrangement according to claim 6 wherein:
   (a) said outer surrounding wall includes an airflow aperture opposing said liquid flow outlet in said drain construction;
      (i) said airflow aperture being in gas flow communication with said second filter element.

8. A filter arrangement according to claim 7 wherein:
   (a) said housing construction includes a central airflow tube defining said gas flow outlet;
      (i) said central airflow tube being circumscribed by said second filter element;
      (ii) said central airflow tube having an airflow hole in airflow communication with said second open filter interior.

9. A filter arrangement according to claim 8 wherein:
   (a) said first filter element includes a centering construction secured thereto;
      (i) said centering construction having a neck construction circumscribed by said central airflow tube; and
      (ii) said centering construction having a lip circumscribing an outer periphery of said housing construction.

10. A filter arrangement according to claim 9 wherein:
    (a) said centering construction includes a planar region between said neck construction and said lip; and
    (b) said second filter element includes first and second opposite end caps with said second media pack extending therebetween;
       (i) said first end cap having a seal member projecting therefrom; and
       (ii) said seal member forming an axial seal with said planar region.

11. A filter arrangement according to claim 10 wherein:
    (a) said coalescer filter element includes a frame construction holding a region of fibrous media therewithin;
       (i) said frame construction including a sealing portion forming a radial seal with said coalescer housing;
    (b) said first media pack comprises pleated paper; and
    (c) said second media pack comprises pleated media.

12. A system comprising:
(a) an engine having an air intake duct, and a crankcase with a blow-by vent;
(b) a first filter element in gas-flow communication with said air intake duct;
   (i) said first filter element constructed and arranged to remove particulates from an air intake stream flowing into said air intake duct;
(c) a blow-by recovery system including:
   (i) a housing construction;
   (ii) a coalescer filter oriented in said housing construction in fluid communication with said blow-by vent;
      (A) said coalescer filter constructed and arranged to separate a liquid phase from liquid entrained gases exiting said blow-by vent;
   (iii) a second filter element oriented in said housing construction downstream of said coalescer filter;
      (A) said second filter element constructed and arranged to remove particulates from gases received from said coalescer filter and flowing into said air intake duct;
      (B) said second filter element being laterally spaced from said first filter element;
(d) a liquid collection arrangement oriented for receiving liquid collected by said coalescer filter; and
(e) a sealing system constructed and arranged to create a first seal between said first filter element and said second filter element.

13. A system according to claim 12 wherein:
(a) said sealing system is constructed and arranged to create a second seal between said second filter element and said housing.

14. A system according to claim 12 wherein:
(a) a ratio of a surface area of the coalescer filter to a surface area of the second filter element is about 1:600–1:700.

15. A system according to claim 12 wherein:
(a) said first filter element is tubular;
(b) said second filter element is tubular with an open filter interior;
   (i) said second filter element being coaxially aligned with and in a stacked configuration relative to said first filter element;
(c) said housing construction includes a central airflow tube with an interior portion in gas flow communication with said air intake duct;
   (i) said second filter element circumscribing said central airflow tube; and
   (ii) said central airflow tube having an aperture providing gas flow communication between said open filter interior of said second filter element and said interior portion of said central airflow tube.

16. A system according to claim 15 wherein:
(a) an open area of said aperture of said central airflow tube is no greater than 40% of an open area of said central airflow tube.

17. A filter element arrangement comprising:
(a) a first end cap;
(b) a second end cap at an end of the filter element arrangement opposite of the first end cap;
(c) a media pack extending between said first and second end caps;
   (i) said media pack arranged in a tubular configuration and defining an open filter interior;
(d) a centering construction including:
   (i) a tubular neck defining an opening in communication with said open filter interior; said tubular neck projecting from the filter element arrangement in a direction away from said media pack;
   (ii) a lip member circumscribing said tubular neck; said lip member projecting from the filter element arrangement in a direction away from said media pack; and
   (iii) an extension being between said tubular neck and said lip member.

18. A filter element arrangement according to claim 17 wherein:
(a) said extension includes a planar region, a segment adjacent to said lip member, and a bend between said planar region and said segment;
   (i) said planar region being secured to said second end cap;
   (ii) said bend having an angle of 70–110° between said planar region and said segment; and
   (iii) said neck projecting axially from said planar region.

19. A filter element arrangement according to claim 18 further including:
(a) a first 0-ring seal member secured to said lip member; and
(b) a second 0-ring seal member secured to said planar region.

20. A filter element arrangement according to claim 19 further including:
(a) an inner liner supporting said media pack and extending between said first and second end caps;
(b) an outer liner supporting said media pack and extending between said first and second end caps;
   (i) said media pack including pleated paper;
   (ii) said lip member having an outermost dimension greater than an outermost dimension of said outer liner; and
   (iii) said neck having an outermost dimension less than an innermost dimension of said inner liner.

* * * * *